United States Patent
Wiseman et al.

(10) Patent No.: US 9,195,825 B2
(45) Date of Patent: Nov. 24, 2015

(54) DATA CONTENT CHECKING

(75) Inventors: Simon Robert Wiseman, Malvern (GB); Katherine Jane Hughes, Malvern (GB)

(73) Assignee: QINETIQ LIMITED (GB)

( * ) Notice: Subject to any disclaimer, the term of this patent is extended or adjusted under 35 U.S.C. 154(b) by 0 days.

(21) Appl. No.: 13/503,264

(22) PCT Filed: Oct. 20, 2010

(86) PCT No.: PCT/GB2010/001937
§ 371 (c)(1),
(2), (4) Date: Apr. 20, 2012

(87) PCT Pub. No.: WO03/094418
PCT Pub. Date: Nov. 13, 2003

(65) Prior Publication Data
US 2012/0226917 A1 Sep. 6, 2012

(30) Foreign Application Priority Data

Oct. 22, 2009 (GB) .................................. 0918479.7

(51) Int. Cl.
*G06F 11/30* (2006.01)
*G06F 21/56* (2013.01)

(52) U.S. Cl.
CPC ..................... *G06F 21/56* (2013.01)

(58) Field of Classification Search
CPC ..................................................... G06F 21/56
USPC ........................................................ 713/193
See application file for complete search history.

(56) References Cited

U.S. PATENT DOCUMENTS 5,416,842 A * 5/1995 Aziz ................................. 380/30
6,014,444 A * 1/2000 Nakamura et al. ............ 380/260

(Continued)

FOREIGN PATENT DOCUMENTS

| WO | WO 02/103533 | 12/2002 |
| WO | WO 03/010670 | 2/2003 |
| WO | WO 03/094418 | 11/2003 |

OTHER PUBLICATIONS

Schmall, "Building an Aniti-Virus Engine", Retrieved from the Internet: URL:http://bandwidthco.com/sf_whitepapers/malwar/Building%20an%20Anti-Virus%20Engine.pdf, Mar. 4, 2002, pp. 1-7.

*Primary Examiner* — Mohammad W Reza
(74) *Attorney, Agent, or Firm* — McDonnell Boehnen Hulbert & Berghoff LLP

(57) ABSTRACT

A data content checker arrangement for protecting communication between a sensitive computer system (102) and an external computer system (104). The arrangement includes a store (108) connected to input and output sub-systems (106) and (114) and to content checkers (110) and (112) arranged in parallel. The input and output sub-systems (106) and (114) are connected to the external computer system (104) and the sensitive computer system (102) respectively. Data received from the external computer system (104) is encrypted by the input sub-system (106) using an encryption key to which the content checkers (110) and (112) have access. The content checkers (110) and (112) can therefore decrypt, read and check the data. If the data passes a content checker's checks, the checker digitally signs and stores it, decrypted, in the store (108); if the checks are not passed, the checker discards the data. The output sub-system (114) delivers data to the sensitive computer system (102) if the data has received both content checkers' digital signatures indicating acceptability.

3 Claims, 7 Drawing Sheets

(56) References Cited

U.S. PATENT DOCUMENTS

| | | | |
|---|---|---|---|
| 6,385,727 B1 * | 5/2002 | Cassagnol et al. | 713/193 |
| 6,646,460 B2 * | 11/2003 | Whetsel | 324/762.02 |
| 7,055,175 B1 | 5/2006 | LePennec et al. | |
| 7,107,618 B1 | 9/2006 | Gordon et al. | |
| 7,188,230 B2 * | 3/2007 | Osaki | 711/216 |
| 7,328,455 B2 * | 2/2008 | Jutzi et al. | 726/26 |
| 7,913,119 B2 * | 3/2011 | Hama | 714/29 |
| 2002/0169976 A1 * | 11/2002 | Schelling et al. | 713/200 |
| 2003/0051154 A1 * | 3/2003 | Barton et al. | 713/201 |
| 2003/0191963 A1 | 10/2003 | Balissat et al. | |
| 2004/0133831 A1 * | 7/2004 | Williams et al. | 714/726 |
| 2007/0033419 A1 * | 2/2007 | Kocher et al. | 713/193 |
| 2007/0061896 A1 | 3/2007 | Ferguson | |
| 2009/0125770 A1 * | 5/2009 | Parulkar | 714/731 |
| 2009/0158432 A1 * | 6/2009 | Zheng et al. | 726/24 |

* cited by examiner

DATA CONTENT CHECKING

FIELD OF THE INVENTION

This invention relates to data content checking, and to a method, a computer system and computer software for implementing it. More particularly, although not exclusively, it relates to content checking for data to be passed between computer systems.

BACKGROUND OF THE INVENTION

It is normal practice to check that data is fit for purpose before it is passed between computer systems, particularly if one of the computer systems handles sensitive information. Data entering a receiving system may be checked to ensure that it is not associated with an attack against that system and its software applications; data leaving a computer system may be checked to ensure it is not being disseminated inappropriately ("leaked"), e.g. contrary to commercial-in-confidence restrictions.

Software products are commercially available for checking that data is not infected with a virus or carrying other kinds of malware such as key loggers: such products include those of Symantec, Sophos and Macaffe. Other products, e.g. those of Clearswift and Purifile, check that data leaving a computer system is not sensitive data being disseminated inappropriately.

A typical prior art arrangement involves a sensitive computer system receiving data after checking that the data is safe and is not part of an attack. Data output from the sensitive system is checked to ensure that it is not being leaked.

However, software products (content checkers) which carry out data checking are themselves potential targets for an attack, particularly if they are running on computer systems handling sensitive material, such as financial transactions. If an attacker makes an attack which succeeds in taking control of a content checker running on a sensitive computer system, the attacker can then disable checks implemented by the checker and thereby allow data to pass inappropriately or use the checker as a platform for launching a further attack against the system.

Software engineering techniques are known which are intended to make content checkers robust against attack, but unfortunately they are not foolproof. Prior art content checkers are therefore associated with potential for failure, which may not be acceptable in critical situations.

It is known to reduce the potential for failure in a computer system by providing for failure restricted to a single component being unable to cause overall system failure: here "system failure" means data passing from one computer system to another without being appropriately checked.

In one prior art arrangement, a sensitive computer system sends data to and receives data from an external computer system via an input/output sub-system linked to a content checker; data passed by the content checker is forwarded to the recipient system. A single failure of either the input/output sub-system or the content checker could lead to overall system failure. If the checker fails to identify inappropriate data and instead wrongly reports it fit to pass, then that data will be passed on and cause damage to a recipient system. Alternatively, the input/output sub-system may fail by passing on data which has not been checked.

A known technique for guarding against failure of a check is to implement the check twice independently, it being unlikely that two independent checks will fail simultaneously: a prior art example of this is two anti-virus products being combined to provide a defence against viruses. If two content checkers are used, both must clear data before it is allowed to pass: even this safeguard may be defeated by failure of an input/output sub-system.

A potential single point of failure represented by an input/output sub-system may be eliminated by dividing it into separate input and output sub-systems with content checking means arranged between them. These sub-systems cease to be single points of failure because the input sub-system can only pass data for content checking, and the output sub-system only receives data which content checking indicates is fit to pass. A single content checker can be a point of failure, but this can be avoided by using two centrally located content checkers arranged in parallel to perform checks simultaneously. An output sub-system receives results from both content checkers and compares them: if both indicate the data passes the checks, the data is passed on. This is an example of the prior art technique of modular redundancy with voting on the outputs. Its disadvantage is that it is necessary to be sure that the two content checkers fail independently, which is difficult to ascertain if the checkers are complex and must handle many different data formats. As more formats need to be handled, the possible dependencies grows so it is difficult to scale up the task of assessing independence.

Voting is usually applied to streams of data that should be identical. For example, an encryption device can be made robust by implementing the encryption twice in parallel and then comparing the outputs, passing encrypted data on only if the two streams are identical. In the case of content checking however, the voting component is more complicated as it must implement a go/no-go decision based on the varied results received from the checkers rather than just compare identical data streams. This complexity makes it difficult to construct the voting component without it becoming a single point of failure.

SUMMARY OF THE INVENTION

It is an object of the present invention to provide an alternative form of and means for data content checking which reduces the scope for a single point of failure.

The present invention provides an automated method of data content checking comprising using a computer system to implement the steps of:
 a) encrypting data,
 b) applying multiple independent content checks to a decrypted copy of the data, and
 c) if the data passes a content check, applying a digital signature to it associated with that check and making it available in unencrypted form for passing on.

The present invention provides the advantage that data is only allowed to pass on if content checking finds it is fit to pass. A single malfunction does not result in system failure, and consequently inappropriate data is not passed on: this is because such data will be found unfit to pass by other checking arrangements. This reduces the scope for inappropriate data transfer due to a single point of failure.

The multiple content checks may be performed in parallel. The method may include:
 a) using an input sub-system to receive data and an output sub-system to pass on data which has passed the content checks, both the input sub-system and the output sub-system being arranged to verify passing of content checks, and
 b) using a respective separate and independent checking means to implement each content check to obtain a respective check outcome and to communicate check outcomes to both the input sub-system and the output sub-system, the output sub-system being arranged to pass on data only if both the input sub-system and the output sub-system have verified that the multiple content checks have been passed.

The method may include:

a) using a respective separate and independent checking means to implement each content check, to apply a respective digital signature and store the data in decrypted form in the store if the data passes that content check, b) using an output sub-system to retrieve decrypted data from the store, to check digital signatures and pass on the data if it has passed the required content checks.

Each multiple content check may provide one of three outcomes, i.e. data is (a) recognised and accepted, (b) recognised and rejected or (c) not recognised. The multiple content checks may be performed by suites of content checkers, the suites having been developed and specified independently of one another. They may each be arranged to detect data embedded in a data item, the embedded data and the data item having different formats, and the method including recycling the embedded data for further checking, and, if data already checked in the data item is acceptable, continuing to check data remaining unchecked in the data item.

Content checks may be associated with modification of data to remove content not required, the method including making modified data available for passing on. A content check providing a positive outcome may be associated with provision of a cryptographic hash of the modified data.

In another aspect, the present invention provides an apparatus for automated data content checking comprising a computer system arranged to implement the steps of:

a) encrypting data,
b) applying multiple independent content checks to a decrypted copy of the data, and
c) if the data passes a content check, applying a digital signature to it associated with that check and making it available in unencrypted form for passing on.

In a further aspect, the present invention provides a computer program product comprising a computer readable medium containing computer readable instructions for controlling operation of a computer system to implement the steps of:

a) encrypting data,
b) applying multiple independent content checks to a decrypted copy of the data, and
c) if the data passes a content check, applying a digital signature to it associated with that check and making it available in unencrypted form for passing on.

The apparatus and computer program aspects of the invention provide a like advantage and have optional preferred features equivalent mutatis mutandis to those of the method aspect.

DESCRIPTION OF THE DRAWINGS

Embodiments of the invention will now be described, by way of example only, with reference to the accompanying drawings. The drawings are only for the purposes of illustrating embodiments of the invention and contrasting the invention with the prior art: they are not to be treated as limiting either the invention or the accompanying claims. In the drawings:

DESCRIPTION OF THE INVENTION

In the following description of prior art and embodiments of the invention, for clarity and convenience of description, functional elements are referred to in a similar way to separate and distinct items of apparatus, e.g. content checkers, input and output sub-systems and data storage. The functionality described for such elements may be implemented by one or more software applications running on a single computer, such as a sensitive computer which the application or applications protect. Consequently, for example, the expressions checker, checker suite and input or output sub-system include sets of instructions which control a computer system to implement the functionality of such checker, suite or sub-system.

Figure 1:
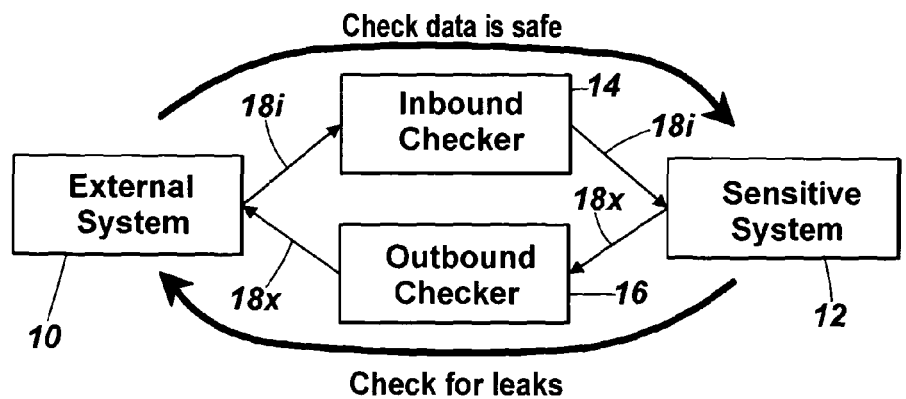
FIG. 1 illustrates a prior art technique for checking data passing between computer systems.

Referring to FIG. 1, a prior art technique for checking data passing between an external computer system 10 and a sensitive computer system 12 employs inbound and outbound content checkers 14 and 16. As indicated by arrows 18*i*, inward bound data passes from the external computer system 10 to the sensitive computer system 12 via the inbound checker 14, which ensures that the data is safe and not part of an attack. As indicated by arrows 18*x*, outward bound data passes from the sensitive system 12 to the external system 10 via the outbound checker 16, which ensures that the data is not sensitive data being leaked. If an attacker makes an attack which succeeds in taking control of one of the content checkers 14 or 16, the attacker can then disable checks implemented by the content checker and allow data to pass unchecked. Each of the content checkers 14 and 16 therefore represents a potential single point of failure.

One approach to reducing the likelihood of failure is to engineer checking arrangements so that no single component failure can lead to overall system failure, defined as unchecked data passing from one network to another.

Although the principle of avoiding single points of failure is well known, it is less clear how this principle can be applied to a content checker.

Figure 2:
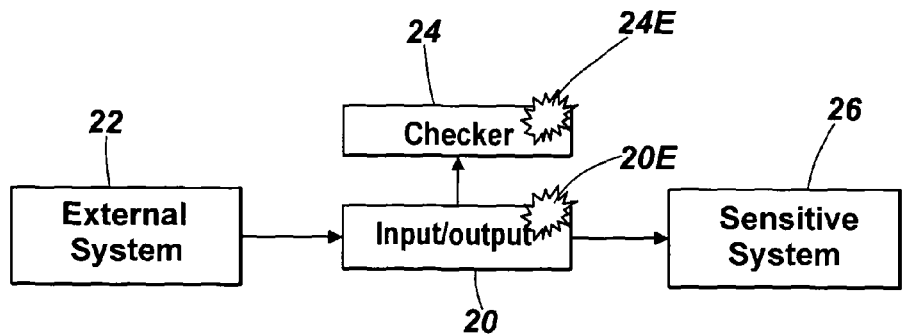
FIG. 2 shows a prior art single content checker arrangement for inbound data.

One known checker arrangement is shown in FIG. 2, in which an input/output sub-system 20 takes inward bound data from an external system 22 and passes it to a checker 24 which applies content checks. If the data passes the checks, the input/output sub-system 20 forwards the data on to a sensitive computer system 26 intended to be protected by the checks. Likewise, an outbound checker (not shown) checks outward bound data passing from the sensitive system 26 to the external system 22. As indicated by respective explosion symbols 20E and 24E, each of the input/output sub-system 20 and the checker 24 is a potential single point of failure, because failure of either one or both of these could lead to an overall failure. If the checker 24 fails to identify inappropriate data, and instead wrongly reports that it is fit to pass, then it will be delivered by the input/output sub-system 20 causing damage of some form to a recipient system. Alternatively, the input/output sub-system 20 may fail by passing data unchecked directly from the external system 22 to the sensitive system 26.

Figure 3:
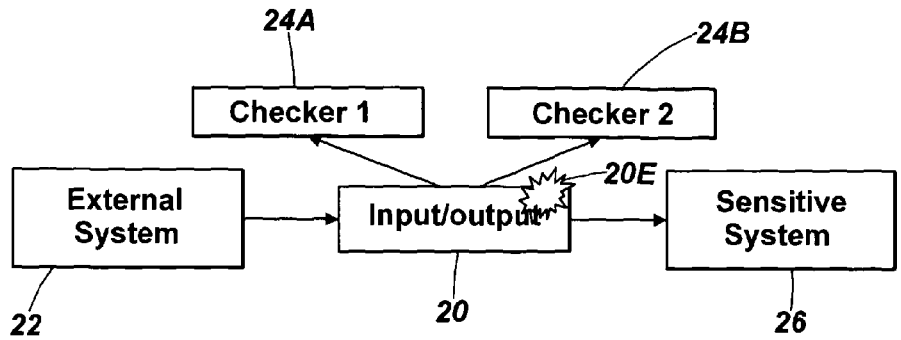
FIG. 3 is equivalent to FIG. 2 using two checkers.

It is known to guard against failure of a check by implementing the check twice, using independent designs of content checker. If one checker fails to identify inappropriate data then the other checker should successfully do so—since the two checkers are independent it is unlikely both will fail simultaneously. One example of two content checkers used together is a combination of multiple anti-virus products from different vendors to improve defence against viruses. FIG. 3 shows such a two-checker arrangement: parts equivalent to those described earlier are like referenced. FIG. 3 is equivalent to FIG. 2 with the sole exception that the input/output sub-system 20 communicates with two checkers 24A and 24B which both apply content checks. The input/output sub-system 20 forwards data to the sensitive system 26 only if both checkers indicate that such data can be passed on. Neither of the checkers 24A and 24B is a single point of failure due to the presence of the other checker. However, the input/output sub-system 20 remains a single point of failure as indicated by explosion symbol 20E because it may fail to invoke the checkers 24A and 24B or fail to assess their results correctly.

Figure 4:
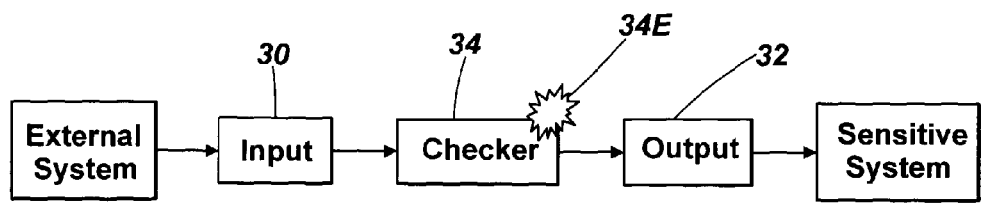
FIG. 4 shows a prior art checker arrangement with a single centrally located checker.

Referring now to FIG. 4, a single point of failure of an input/output sub-system is eliminated by dividing it into an input sub-system 30 and a separate output sub-system 32 with an intervening content checker 34. With this arrangement, the input sub-system 30 ceases to be a single point of failure, because all it can do is pass data to the checker 34. The output sub-system 32 is not a single point of failure either, because it only receives data that the checker 34 regards as fit to pass. However, the checker 34 remains a single point of failure, as indicated by explosion symbol 34E, because it may fail to assess the content correctly.

Figure 5:
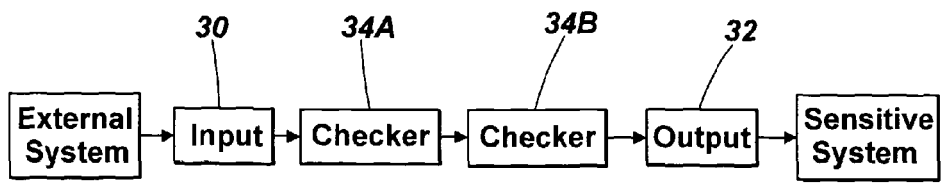
FIG. 5 shows a checker arrangement with two centrally located checkers in series.

Although it is not prior art so far as the inventors are aware, it is possible to avoid the checker 34 being a single point of failure by using the arrangement shown in FIG. 5, in which parts equivalent to those described earlier are like referenced. FIG. 5 is equivalent to FIG. 4 with the single checker 34 replaced by two checkers 34A and 34B connected in series, i.e. the output of checker 34A feeds the input of checker 34B. Both checkers 34A and 34B apply content checks which data must pass to allow it to be forwarded to a sensitive system 36: i.e. only if both checkers deem data to be acceptable does it pass. Neither of the checkers 34A and 34B is a single point of failure, assuming they fail in independent ways, due to the presence of the other checker.

The configuration shown in FIG. 5 suffers from the disadvantage that the second checker 34B cannot operate until the first checker 34A finishes its check and outputs the data. This introduces latency: i.e. delivery of data takes twice as long as it would if it were subjected to only one check.

Figure 6:
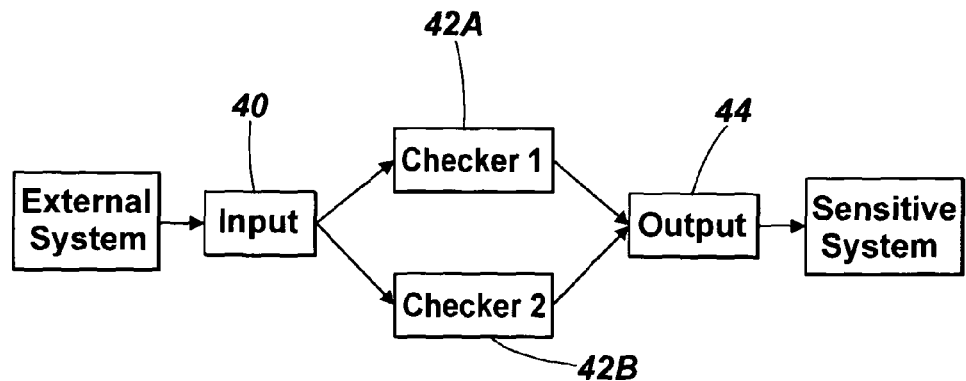
FIG. 6 is equivalent to FIG. 4 with two centrally located checkers in parallel.

Latency can be avoided by performing checks in parallel instead of in series, as shown in FIG. 6, which relates to a prior art technique. Here an input sub-system 40 copies data to two checkers 42A and 42B connected in parallel, and these checkers consequently apply checks to the data simultaneously. If the checks are passed, each of the checkers 42A and 42B sends the data on to an output sub-system 44, but if the checks are failed the respective checker sends a failure message and discards the data.

The output sub-system 44 receives checking results from both checkers 42A and 42B and compares them. If both checkers 42A and 42B indicate that the data passes their checks, and the same data is received from both, the output sub-system 44 delivers the data onwards.

If the input sub-system 40 malfunctions and passes different data to the checkers 42A and 42B, the output sub-system 44 will at best receive different data and will discard it. If one of the checkers 42A and 42B malfunctions, the output sub-system 44 will again receive different results and so discard the data. If the data fails a check and the output sub-system 44 malfunctions then it has no data to pass on. Hence there is no single point of failure. This design is an example of the standard technique of modular redundancy with voting on the outputs, which is known for use in avionics. However, its disadvantage is that it is difficult to scale, since as more checkers are added the number of connections handled by the input sub-system 40 and output sub-system 44 increases.

Figure 7:
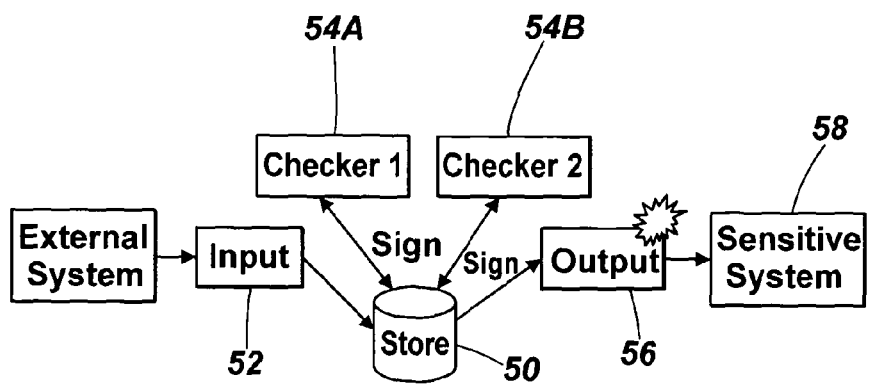
FIG. 7 illustrates the use of multiple checkers with data signatures.

Referring now to FIG. 7, which does not relate to a prior art technique so far as the inventors are aware, it is possible to use a common store 50 and digital signatures to ensure two checks are applied. Here an input sub-system 52 marks incoming data as being unchecked and places it in the store 50. Two checkers 54A and 54B are connected in parallel to the store 50: each of these checkers looks for new data in the store 50, reads such data if available and checks it. If either of the checkers 54A and 54B finds the data is not fit to pass then it deletes that data from the store 50. If one of the checkers 54A and 54B finds that the data is fit to pass, that checker signs the data digitally to indicate that the data has been checked and returns it with the signature to the store 50. An output sub-system 56 then looks for data in the store 50 that has been checked by both checkers 42A and 42B, and, after confirming that the digital signatures are valid, it forwards the data to a sensitive computer system 58. The advantage of this arrangement is that it scales easily since more checkers can be added without changing the connectivity of the input and output sub-systems. However, this arrangement has the disadvantage that the output sub-system 56 is a single point of failure, because it can take data from the store 50 and pass it on without it being checked, and it is complex because of the nature of the comparisons it must perform.

Figure 8:
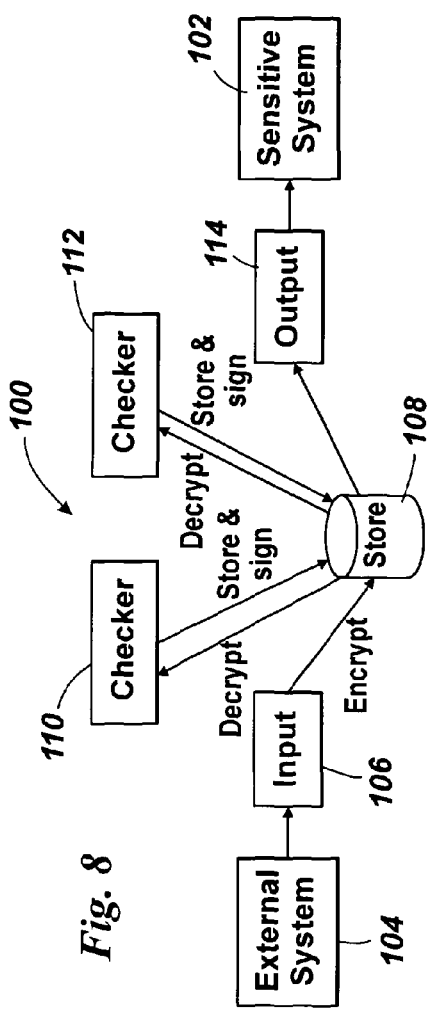
FIG. 8 shows a content checker arrangement of the invention which uses encryption.

Referring now to FIG. 8, there is shown a checker arrangement of the invention indicated generally by 100: the checker arrangement 100 provides content checking to protect a sensitive computer system 102. An external computer system 104 is connected to an input sub-system 106, which itself is connected to a store 108. The store 108 is also connected to first and second content checkers 110 and 112 in parallel and to an output sub-system 114, which itself is connected to the sensitive computer system 102. In practice, each of the checkers 110 and 112 is a separate computer hosting content checking software and also control software for decrypting and signing data. These computers can communicate with the store 108 but not with the sensitive and external systems 102 and 104.

The checker arrangement 100 operates as follows. The external computer system 104 provides input data to the input sub-system 106, which uses an encryption key to encrypt the data: the content checkers 110 and 112 also have access to this encryption key, but the output sub-system 114 does not. Each of the content checkers 110 and 112 can therefore decrypt, read and check the data. If the data passes the checks of one of the content checkers 110 and 112, that checker generates a digital signature covering the decrypted data and stores the signature and the decrypted data in the store 108; a digital signature for data is derived by computing a cryptographic hash of the data and then encrypting the hash with an encryption key which may be a secret key. In this embodiment, the checkers 110 and 112 have different keys. If the checks of the content checker 110 or 112 are not passed by the data, that checker does not store the data in the store 108, but instead discards it.

Once one of the content checkers 110 and 112 has stored the data in decrypted form in the store 108, the output sub-system 114 can read it. However, the output sub-system 114 waits until both content checkers 110 and 112 finish checking and have signed the data with respective digital signatures. Once the two signatures are found, the output sub-system 114 delivers the data to the sensitive computer system 102.

Thus data only reaches the output sub-system 114 if at least one of the content checkers 110 and 112 deems the data fit to pass. The output sub-system 114 will deliver the data to the sensitive computer system 102 only if both content checkers 110 and 112 have deemed the data fit for so doing. Should the output sub-system malfunction 114 and send data that has only been passed by one checker 110 or 112, no system failure occurs because the data has been passed by a checker. Consequently there is no single point of failure in the checker arrangement 100. Care should be taken to ensure that the encryption/decryption functions of the input sub-system 106 and the content checkers 110 and 112 do not introduce a single point of failure, but this can be done by using implementations of these items produced by independent sources.

Figure 9:
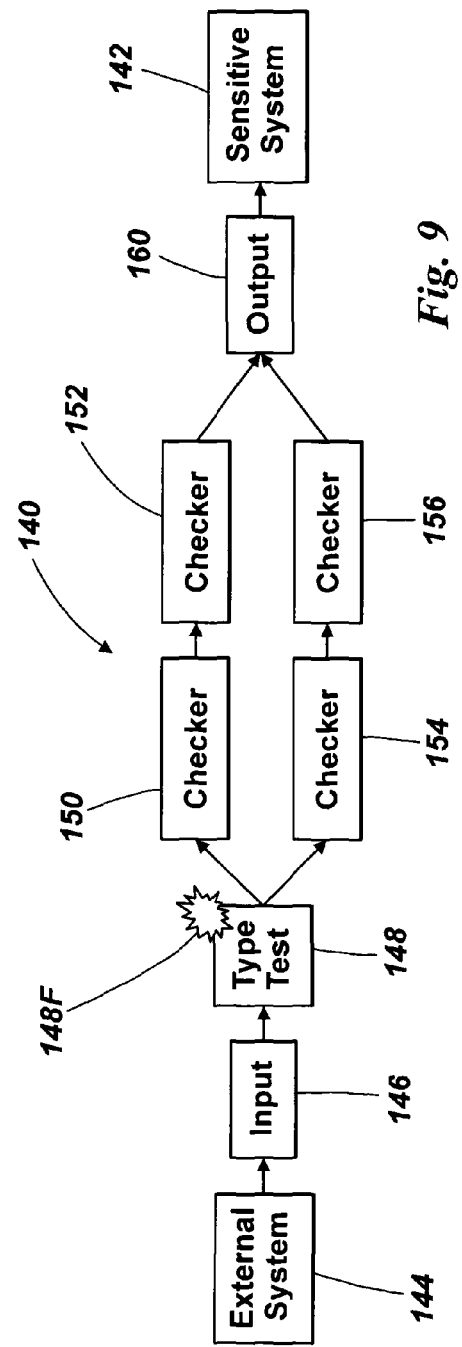
FIG. 9 illustrates a potential single point of failure in a checker arrangement using data type determination.

There is also a need for capability to deal with different types of data each requiring a different checker. If a checker arrangement has functionality for all necessary checks in a single sub-system, it is more vulnerable to attack; moreover, establishing that there are no single points of failure in different implementations is more difficult. This may be at least partly dealt with by providing separate content checkers for each type of document that needs to be checked. One checker arrangement 140 implementing this is for a sensitive computer system 142 is shown in FIG. 9, in which an external computer system 144 is connected to an input sub-system 146, connected in turn to a type test sub-system 148. The type test sub-system 148 has potential for failure indicated by an explosion symbol 148F; it is also connected to a parallel arrangement of two series-connected pairs of content checkers 150 to 156, i.e. a first pair 150/152 in parallel with a second pair 154/156. The parallel arrangement of content checkers 150 to 156 is also connected to an output sub-system 160 in turn connected to the sensitive computer system 142.

The checker arrangement 140 operates as follows. The external computer system 144 provides input data to the input sub-system 146, which passes it to the type test sub-system 148. The type test sub-system 148 examines the input data to determine whether it is of appropriate format for checking by the first series-connected pair of content checkers 150 and 152 or the second such pair 154 and 156. The type test sub-system 148 routes the input data to the content checker pair which it selects as more appropriate for the data's format; the data is then checked successively by each checker of the selected pair 150 and 152 or 154 and 156 for suitability for the sensitive computer system 142. If the input data passes the checks of the first of the selected pair of content checkers, that checker passes on the data to the second of the selected pair for further checking similarly; if the input data passes the checks of the second of the selected pair, that checker passes on the data to the output sub-system 160 and thence to the sensitive computer system 142. If any of the checkers 150 to 156 receives input data and finds it is not appropriate for the sensitive computer system 142, it discards the data; consequently, only if both checkers of the selected pair 150 and 152 or 154 and 156 deem the data to be acceptable (i.e. neither of them discards it) does the data reach the output sub-system 160 and the sensitive computer system 142.

At first sight the checker arrangement 140 appears to lack any single point of failure; however the type test sub-system 148 could fail to identify correctly the type or format of data in a document and send it to the wrong checker pair 150/152 or 154/156: if the wrong checker pair can be guaranteed to discard such data this is not serious, but that not is the case for data formats which are specialisations of other formats. For example, an RTF document is a special case of plain text: consequently, a plain text checker will not find an RTF document to be harmful, even though the same document when interpreted as RTF might contain damaging data such as macros. Thus if the type test sub-system 148 exhibits a single failure 148F which causes data to be sent to the wrong checker pair 150/152 or 154/156, the result may be data being inadequately checked and passed to the output sub-system 160 and thence to the sensitive computer system 142 contrary to what is required.

Figure 10:
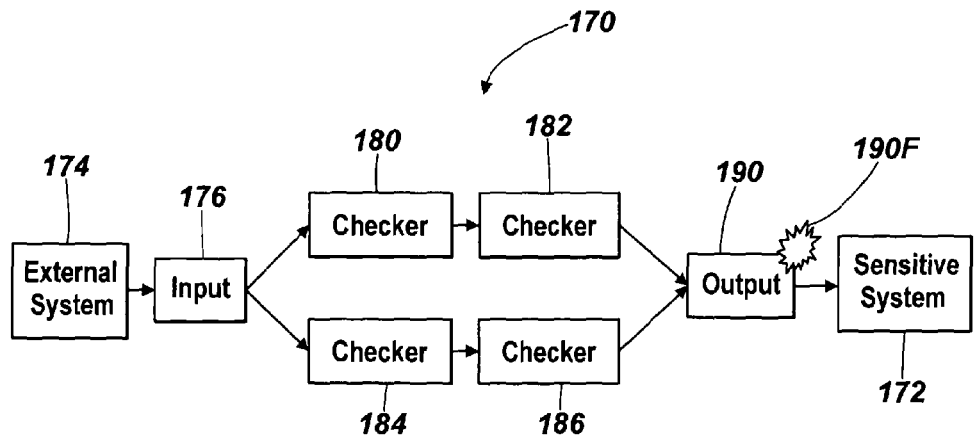
FIG. 10 illustrates a potential single point of failure in a parallel checker arrangement.

FIG. 10 shows a checker arrangement 170 which avoids the problem of data being sent to the wrong checker pair. Parts equivalent to those described in relation to FIG. 9 are like-referenced with the addition of 30 to the reference numeral. The checker arrangement 170 of FIG. 10 will not be described in detail: it is equivalent to the checker arrangement 140 of FIG. 9 with the removal of the type test sub-system 148, and with all input data passing from the input sub-system 176 to all content checkers 180 to 186. Consequently, the output sub-system 190 may receive multiple copies of the input data, i.e. one copy from each content checker which has not discarded the data because it has not found the data to be unacceptable. The output sub-system 190 only forwards the data if all checkers report that it is acceptable for receipt by the sensitive computer system 172.

The checker arrangement 170 lacks a type test sub-system 148, which therefore cannot be a single point of failure. However, instead the output sub-system 190 has potential to be a single point of failure as indicated by explosion symbol 190F because it might fail to assess correctly the outputs from all of the checkers 180 to 186: in consequence, the output sub-system 190 may forward data received from one of the checkers 180 to 186 if that checker determines such data to be acceptable for receipt by the sensitive computer system 172, even though one or more of the other checkers has discarded that data. For example, some RTF data may be passed to a pair of RTF checkers and a pair of text checkers. If the nature of the RTF data is such as to merit blocking, the text checkers are unlikely to discern this and so will pass the data on to the output sub-system 190. Thus, despite there having been no failure of any of the checkers 180 to 186, the output subsystem 190 has received data that should have been blocked. Hence the output sub-system 190 might pass data on if a malfunction occurs.

The output sub-system 190 could be constructed using fault tolerant techniques such as triple modular redundancy, but the complex checks to be performed make this difficult.

Figure 11:
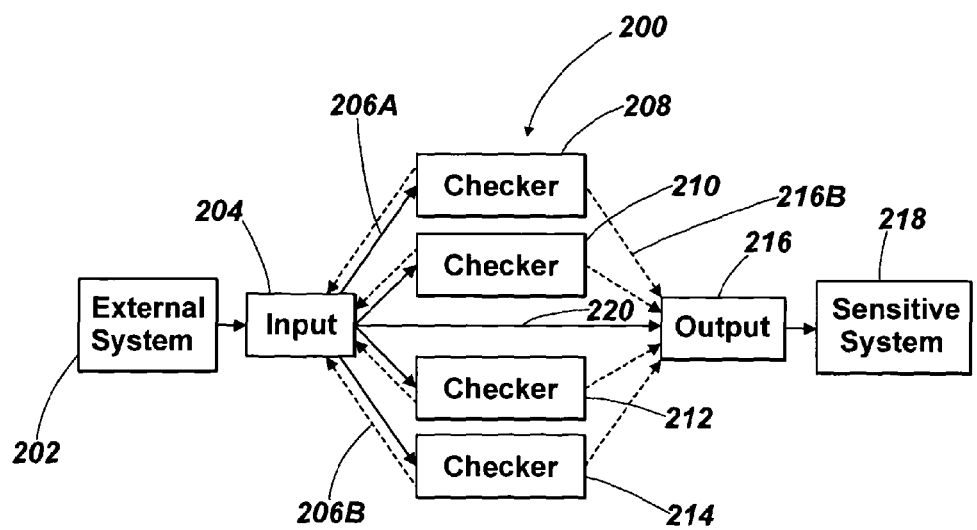
FIG. 11 shows a content checker arrangement of the invention having multiple elements to implement a release decision.

Referring now to FIG. 11, there is shown an embodiment 200 of a checker arrangement of the invention which overcomes the output sub-system malfunction problem discussed above. An external computer system 202 is connected to an input sub-system 204, which itself is connected to a parallel arrangement of four content checkers 208 to 214: this parallel arrangement is also connected to an output sub-system 216, which is connected in turn to a sensitive computer system 218.

The checker arrangement 200 operates as follows. Incoming data from the external computer system 202 is passed by the input sub-system 204 to all four checkers 208 to 214 as indicated by solid arrows such as 206A. However, in this embodiment the checkers 208 to 214 do not pass acceptable data on to the output sub-system 216. Instead each checker reports the outcome of its checks (i.e. whether the data is acceptable or not) to both the input sub-system 204 and the output sub-system 216 as indicated by chain line arrows such as 206B and 216B. The input sub-system 204 receives the outcomes of the checks by all four checkers 208 to 214, and from those outcomes judges whether or not the data is acceptable for forwarding to the sensitive computer system 218. If the data is not acceptable, it is discarded by the input sub-system 204; otherwise, if the data is acceptable, the input sub-system 204 passes it via a line 220 to the output sub-system 216.

The output sub-system 216 receives the outcomes of the checks by all four checkers 208 to 214. It also receives data from the input sub-system 204 if one of the following events occurs: i.e. (a) the checker outcomes for that data are all positive, i.e. all four checkers determine the data to be acceptable, or (b) the input sub-system 204 malfunctions and relays the data to the output sub-system 216 when the checker outcomes are not all positive. The output sub-system 216 determines from the outcomes whether or not to pass the data to the sensitive computer system 218. The decision to deliver data to the sensitive computer system 218 is therefore split between the input and output sub-systems 206 and 216: neither of these sub-systems is solely responsible for a decision being correct.

Consequently, if the input sub-system 204 malfunctions and passes data to the output sub-system 216 in error, the output sub-system will not forward that data because the checker outcomes are not all positive. Unacceptable data is therefore not passed on to the sensitive computer system 218 unless both the input sub-system 206 and the output sub-system 216 both malfunction at the same time. The input and output sub-systems 204 and 216 are implemented in such a way that they do not have a common mode of failure, and consequently the checker arrangement 200 avoids having a single point of failure at least as regards releasing data without appropriate checker outcomes using checkers appropriate for that data.

A variant of this approach is also possible. The input sub-system 204 may retain data until the data is requested by the output sub-system 216: this does not affect the criterion that data is not passed unless it is found to be acceptable by both input and output sub-systems 204 and 216, but it has the advantage of placing the output sub-system 216 in control, which is often easier to implement.

It would seem that the checker arrangement 200 entirely avoids a single point of failure. However, there is another potential failure mode: the input sub-system 204 could fail by sending different data to the checkers 208 to 214 as compared to data that it sends to the output sub-system 216. If the input sub-system 204 sends acceptable data to the checkers 208 to 214 but unacceptable data to the output sub-system 216, the output sub-system 216 will receive all positive checker outcomes and will therefore wrongly determine that the unacceptable data is suitable for passing on to the sensitive computer system 218. This potential failure mode corresponds to a single point of failure: it may be obviated by the use of cryptographic techniques. In this regard a cryptographically strong hash of data is a function that generates a value which characterises that data, and it is a property of such a hash that it is impractical to find two different items of data having the same hash value. An example of such a function is SHA-256.

Using a cryptographic hash approach, when any one of the checkers 208 to 214 determines a "pass" outcome, i.e. data is determined to be suitable for passing on to the sensitive computer system 218, that checker applies a hash function to the data to produce a value that identifies the data it has checked (no hash is sent for data which has failed the check). This value is sent along with the "pass" outcome to the output sub-system 216. The hash value cannot be used to determine the data to which it relates, so the output sub-system 216 can still only pass on data which it has received from the input sub-system 204. However, the hash value allows the output sub-system 216 to confirm that the data received from the input sub-system 204 is the same as that checked by the checkers. The output sub-system 216 does this by applying the hash function to the data received and confirming that the value obtained is the same as received from the checkers 208 to 214. So if the input sub-system 204 malfunctions and sends data to the checkers 208 to 214 which is different to that sent to the output sub-system 216, the output sub-system discards that data because the data hash values from the checkers are not equal to the hash value of data from the input sub-system 204. With this cryptographic approach, neither the input sub-system 204 nor the output sub-system 216 represents a single point of failure.

In the checker arrangement 200, each of the checkers 208 to 214 has respective separate connections to the input sub-system 204 and the output sub-system 216. In an alternative embodiment, checkers are not connected to input and output sub-systems: instead the checkers and input and output sub-systems are all connected to a common store (as in the checker arrangement 100 shown in FIG. 8). The store is for use in conjunction with encryption and signing of data to ensure all required checks are made. In this alternative arrangement, the input sub-system encrypts received data and places the resulting encrypted data in the store. Apart from the input sub-system, only the checkers have access to a key suitable for decryption of the encrypted data, which consequently cannot be read by the output sub-system. Each of the checkers decrypts and checks the data, and stores its results of checking (pass or fail outcome) in the store together with a digital signature that can be verified by both the input and output sub-systems. Once all the checkers have completed their checks, the input sub-system accesses the store, checks the checkers' results and their digital signatures. If the results are all positive (pass outcome) and all digital signatures are valid, the input sub-system decrypts the data and stores it in decrypted form in the store. The decrypted data can now be read by the output sub-system, which also checks all the checkers' results: if the checkers' results are all positive, the output sub-system takes the decrypted data and forwards it on to a sensitive computer system. Should the data fail any checks, the output sub-system cannot malfunction by forwarding it in decrypted form as it will not have been decrypted by the input sub-system unless that has also malfunctioned. Consequently, a single point of failure does not result in unacceptable data being forwarded to the sensitive computer system.

It is possible to adapt the checker arrangement 200 to cope with data formats which the checkers 208 to 214 do not recognise. A checker may indicate that data is fit to pass to a sensitive computer system because it does not recognise the format of the data. For incoming data this gives difficulty if, for example, there is unanticipated functionality in a software application which is running on the sensitive computer system and which may interpret the data in a damaging way. As regards outgoing data, an application might have encoded some sensitive information therein: if the outgoing data format is not recognised by the checkers, the data's unsuitability for sending out will not be detected.

To avoid the problem of passing data with an unrecognised format, all checkers are arranged to process data and report one of three states: i.e. the data is (1) recognised and accepted, (2) recognised and rejected or (3) not recognised. The input and output sub-systems apply tests to ensure that data is allowed to pass only if recognised and allocated a pass outcome by at least two checkers and not rejected by any checker.

The input and output sub-systems may be arranged to implement more complex tests designed to ensure that if data is recognised by one checker it is also recognised by one or more others. For example, data which is recognised by an RTF checker should always be recognised by a text checker, because RTF is a special case of text. They may also be arranged so the number of checkers required to report the data is recognised and accepted before it is released varies according to the type of data. For example, two checkers might need to report the acceptability of text documents but three might need to report the acceptability of RTF documents because this is a more complex format and more confidence in the checks is required.

The checker arrangement 200 of FIG. 11 avoids single points of failure. However it is possible that checking might not be effective if the wrong checkers were to be specified or a relationship between related data formats were to be misinterpreted. One way of avoiding checker specification failure is to provide multiple suites of checkers which are independently specified and developed. Suites of checkers may be arranged either in series or in parallel.

Figure 12:
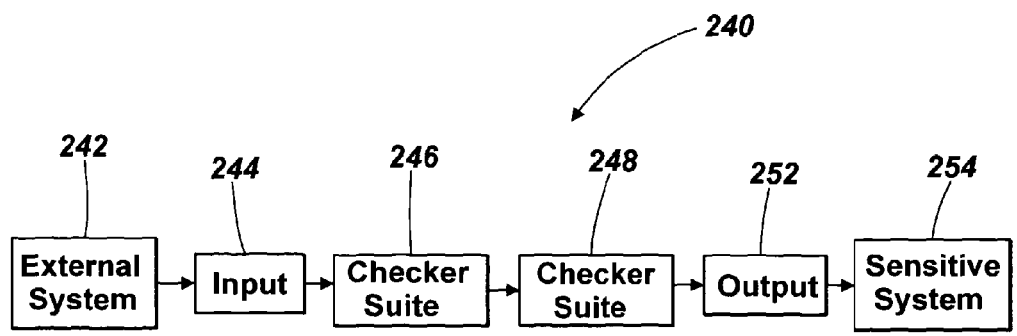
FIG. 12 shows a content checker arrangement of the invention having multiple suites of checkers in series.

Referring now to FIG. 12, a checker arrangement 240 of the invention is shown which uses checker suites which are developed and specified independently and arranged in series. An external computer system 242 is connected to an input stage 244, which is in turn connected to a first suite of content checkers 246 in series with a second such suite 248. Each of the suites 246 and 248 consists of a respective set of content checkers (not shown) arranged in parallel as illustrated in FIG. 11 for checkers 208 to 214. The second suite 248 is also connected to an output stage 252, which itself is connected to a sensitive computer system 254.

Each of the suites 246 and 248 has its own input and output sub-systems (not shown), which assess results from the respective suite's entire set of checkers to determine whether or not to pass the data. The pass/fail output sub-system of the first checker suite 246 passes data to the input sub-system of the second checker suite 248 if the data is judged acceptable: here, in the case of data with a prearranged recognised format, "acceptable" means allocated a pass outcome by all checkers in the suite. In the case of data not necessarily having a prearranged recognised format, "acceptable" means recognised and allocated a pass outcome by at least two checkers in the suite and not rejected ("failed") by any checker in the suite. Likewise, if the second checker suite 248 judges data acceptable on the same basis, it passes on the data to the output stage 252, and thence to the sensitive computer system 254. Data which is found not to be acceptable by one or both of the suites 246 and 248 is discarded and does not reach the sensitive computer system 254.

Figure 13:
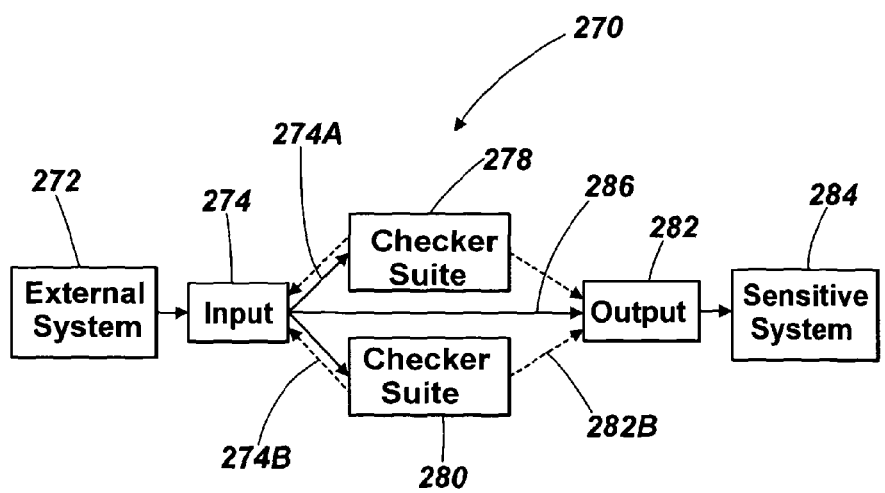
FIG. 13 shows a content checker arrangement of the invention having multiple suites of checkers in parallel.

Referring now to FIG. 13, a checker arrangement 270 of the invention is shown which uses checker suites in parallel. In the checker arrangement 270, an external computer system 272 is connected to an input stage 274, which is in turn connected to a parallel arrangement of two content checker suites 278 and 280. Each checker suite provides its own input and output sub-systems (not shown), which assess the results of all of that suite's checkers to determine whether or not to pass on the data. The parallel arrangement of content checker suites 278 and 280 is also connected to an output stage 282 connected in turn to a sensitive computer system 284. Each of the content checker suites 278 and 280 consists of a respective set of content checkers arranged in parallel as illustrated in FIG. 11 for checkers 208 to 214.

The checker arrangement 270 operates as follows. Incoming data from the external computer system 272 is passed by the input stage 274 to all of the checkers in each of the suites 278 and 280 as indicated by solid arrows such as 274A. Each checker suite's input and output sub-systems assess the results of the suite's checkers to determine a pass or fail outcome for the incoming data, and then provides a single collective outcome: e.g. the outcome may be fail if any one or more checkers indicates fail, or pass if the data is allocated a pass outcome by at least two checkers in the suite and not rejected by any other checker in the suite (as for the checker arrangement 240).

Each of the suites 278 and 280 reports the single collective outcome of its checks to the input and output stages 274 and 282 as indicated by chain line arrows such as 274B and 282B. From the single collective outcomes of both suites 278 and 280, the input stage 274 judges whether or not the data is acceptable for forwarding to the sensitive computer system 284. If the data is not acceptable, it is discarded by the input stage 274; otherwise, if the data is acceptable, the input sub-system passes it via a line 286 to the output stage 282. If the output stage 282 confirms that the data is acceptable, it passes the data on to the sensitive computer system 284.

Figure 14:
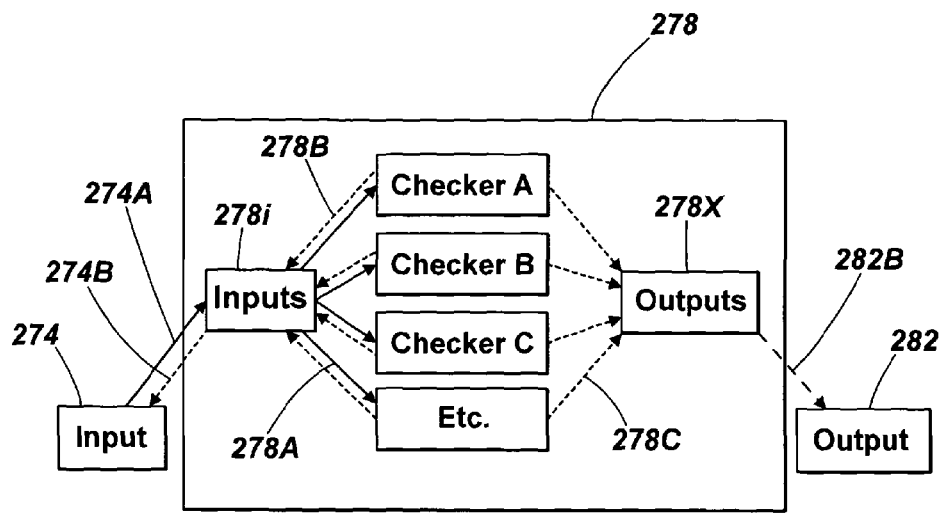
FIG. 14 shows a checker suite incorporated in the FIG. 13 checker arrangement.

Referring now also to FIG. 14, there is shown a part of the checker arrangement 270 of FIG. 13 in more detail, i.e. the input stage 274, first checker suite 278, output stage 282 and connections 274A, 274B and 282B. The first checker suite 278 has input and output sub-systems $278i$ and $278x$, together with checkers labelled Checker A, Checker B, Checker C and "Etc.": here Checkers A to C indicate three individual checkers respectively and "Etc." indicates one or more additional checkers, the total number of checkers being as necessary for use in the checker arrangement 270.

In operation, as indicated by solid arrows such as 274A and 278A, incoming data passes to individual checkers (e.g. Checker A) in the first checker suite 278 via the input stage 274 and input sub-system $278i$; each of these checkers determines a respective pass or fail outcome for the incoming data and passes it to the input and output sub-systems $278i$ and $278x$ as indicated by chain line arrows such as 278B and 278C. The input and output sub-systems $278i$ and $278x$ assess these outcomes and, as described previously, provide respective single collective outcomes via connections 274B and 282B to the input stage 274 and output stage 282. The first and second checker suites 278 and 280 have like construction and mode of operation. To ensure that no provider of checking sub-systems represents a common point of failure, two independent providers may be used—one of whom provides the input sub-system 278*i* and a suite of checkers while the other develops the output sub-system 278*x* and a second suite of checkers.

There exists another consideration affecting content checkers, in that a data file may contain more than one type of data: i.e. one type of data may contain another type of data embedded in it. This may be accommodated by a more complex arrangement of checkers. For convenience of description, such an arrangement will be described for an individual suite of checkers (as opposed to a set of pair-wise checkers).

Figure 15:
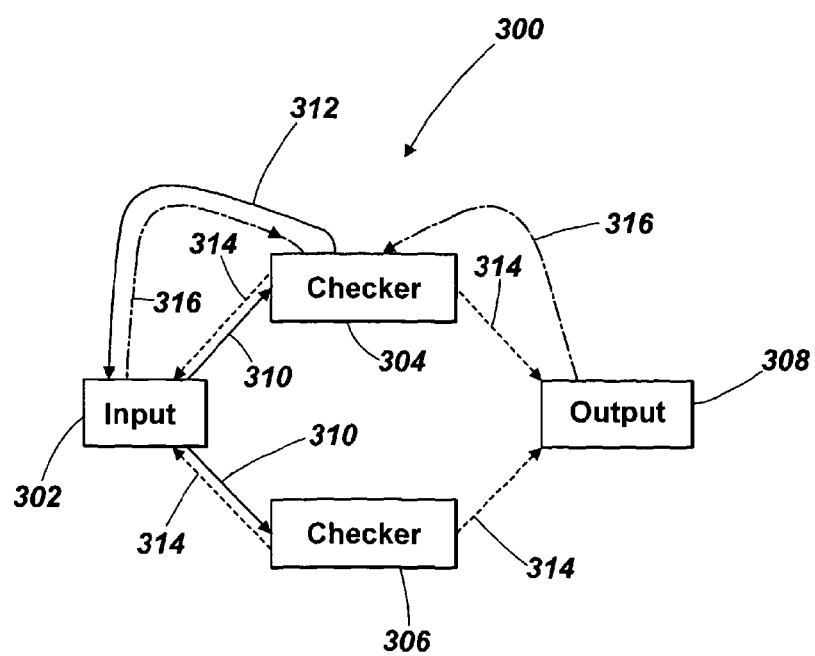
FIG. 15 shows a content checker arrangement of the invention which is suitable for checking data of one type in which data of another type is embedded.

Referring now to FIG. 15, part of an embodiment 300 of a checker arrangement of the invention is shown which is suitable for checking embedded data. Connections to external and sensitive computer systems and other suites of checkers are not shown. The checker arrangement 300 incorporates a checker suite which has an input sub-system 302 connected to multiple content checkers represented by two content checkers 304 and 306 for convenience of illustration (a checker suite will normally have more than two content checkers). The content checkers 304 and 306 are connected to an output sub-system 308.

Incoming data is passed by the input sub-system 302 to both checkers 304 and 306, as indicated by solid arrows 310. Each checker assesses the data to determine a pass or fail outcome as previously described. However, in this embodiment, one or both of the checkers 304 and 306 may identify embedded data of a type that it cannot check in the otherwise checkable incoming data: if so, the checker extracts the embedded data and passes it back to the checker suite's input sub-system 302 as indicated by solid arrow 312. The embedded data is then checked as before, by passing it to the entire set of checkers in the checker suite, and the results of these checks and hashes of the data are passed to both input and output sub-systems 302 and 308 for assessment as indicated by chain line arrows 314. Subsequently, both the input and output sub-systems 302 and 308 pass the results of the checks back to the checker that identified the embedded data. Neither of the input and output sub-systems 302 and 308 forwards the data. The checkers 304 and 306 are therefore permitted to invoke checking recursively.

The checker 304 or 306 that identified the embedded data receives the results of recursive checking from both the input and output sub-systems 302 and 308, as indicated by dot/dash arrows 316. The results received from each of these sub-systems also include a respective cryptographic hash of the data checked. The checker confirms that the same results are received from both the input and output sub-systems 302 and 308 and that the hashes are both correct.

If the results of these checks are acceptable, the invoking checker continues to check data hitherto unchecked in the incoming data. If the results of these checks are not acceptable, the data is discarded and a 'reject' result is returned for the document or file in which the data is contained. As with all recursive routines, to avoid infinite recursion a limit is defined regarding maximum depth of embedding and a count of depth of checking is passed with the data to enable recursion to be terminated at this limit: otherwise, infinite recursion would be possible, e.g. for data formats with a malformed structure which represents a document that contains itself. An example of this is a first ZIP file that contains a second ZIP file that contains the first.

Should a first checker fail to identify some embedded content or fail to assess the results of a check correctly, no damage should result because a second checker (which is developed independently of the first checker) should succeed in so doing.

Where data of one format is embedded in some container data of another format, the embedded data can appear to be valid with respect to both formats. For example, a ZIP file may be embedded in a MIME document using a binary encoding. Such a MIME document meets the specification of a MIME document as well as a ZIP file. As long as the data is acceptable as regards both MIME and ZIP formats, the checkers will pass it. However, the embedded data (ZIP in this case) is checked twice: a ZIP checker treats the data as a ZIP file with arbitrary data at the start and end, and a MIME checker treats the data as a MIME file containing the ZIP file as embedded data.

To avoid the inefficiency of the embedded data being checked twice, the input sub-system 302 may be arranged to calculate a cryptographic hash for data which has been extracted and check the hash against hashes of previously checked data. If a match is found, the input sub-system 302 returns a like checking result as returned previously instead of sending the data for checking. The output sub-system 308 must also maintain a list of hashes that have been reported to it as corresponding to successfully checked data, and report to the checker 304 or 306 which finds some embedded data that such data has already been checked successfully and need not be checked again.

In some cases it may be useful for a content checker to modify data presented to it, e.g. to remove redundant but undesirable content rather than to prevent the data being delivered because of the presence of such content. For example, in the case of a content checker for an image file format incorporating scan lines, it might be appropriate for the checker to set unused pixel data at the end of each scan line to zero. For embodiments in which the input sub-system forwards data to the output sub-system, modified data must be delivered back to the input sub-system for such forwarding. Moreover, embodiments in which the checker reports a checking outcome to the output sub-system with a cryptographic hash of data, the hash must be of the modified data.

It is assumed that each of the checkers in an embodiment of the invention will modify data in the same way. For simple transformations this is not a problem, but if a complex transformation were to be required it becomes less likely that two independent checker implementations will produce exactly the same result, in which case the hash values produced will be different and an output sub-system will not pass on data associated with two or more different hash values. This problem is avoidable by transforming data before it is checked, so that checkers do not need to modify it.

The functionality of elements of the embodiments of the invention described with reference to FIGS. 10 to 14 may be implemented by one or more software applications running on a single computer connected between the external system (e.g. 202) and the sensitive computer system (e.g. 218), or by one or more software applications running the sensitive computer system itself (which the application or applications protect). In particular, such application or applications would implement the functionality of all elements illustrated in any one of FIGS. 10 to 14 with the exception of the functionality indicated for an external system (202, 242, 272) or a sensitive computer system (218, 254, 284).

The procedures given in the foregoing description can clearly be implemented by appropriate computer software comprising instructions encoded upon an appropriate computer readable carrier medium and running on a conventional computer system. The carrier medium may be a memory, a floppy or compact or optical disc or other hardware recording medium, and may be incorporated in a computer program product. Such software is straightforward for a skilled programmer to implement from the foregoing description without requiring invention, because it involves well known computational procedures.

The invention claimed is:

1. A data content checking process comprising the steps of:
   a) an input sub-system of a computing apparatus receiving data from an external computer system, the input sub-system encrypting the received data and then depositing the encrypted data in a store of the computing apparatus,
   b) using separate and independent checking means of the computing apparatus to each decrypt and then apply a content check to the data deposited in the store for the purpose of checking whether or not the data is safe for use with a sensitive computer system,
   c) if the data passes a content check, the respective checking means which implemented that content check then generating a digital signature for indicating that the data has passed the content check and storing a copy of the decrypted data and the generated signature associated therewith in the store, and
   d) using an output sub-system of the computing apparatus to retrieve the decrypted data from the store, to check the at least one digital signature associated therewith and to pass on the decrypted data to the sensitive computer system if it has passed the content checks.

2. Apparatus for automated data content checking comprising:
   at least one processor and at least one memory:
      a. an input sub-system of a computing apparatus which can interact with the at least one processor and the at least one memory for enabling the input subsystem to receive data from an external computer system, encrypt the received data and then deposit the encrypted data in a store of the computing apparatus,
      b. separate and independent checking means of the computing apparatus, the separate and independent checking means each having a respective processor and a respective memory for enabling the separate and independent checking means to each decrypt and then apply a content check to a copy of the data deposited in the store for the purpose of checking whether or not the data is safe for use with a sensitive computer system, wherein
      c. if the data passes a content check, the respective checking means which implemented the content check capable of then generating a digital signature for indicating that the data has passed the content check and storing a copy of the decrypted data and the generated signature associated therewith in the store, and
      d. an output sub-system of the computing apparatus, wherein the output sub-system can interact with the at least one processor and the at least one memory for enabling the output sub-system to retrieve the decrypted data from the store, to check the at least one digital signature associated therewith and to pass on the decrypted data to the sensitive computer system if it has passed the content checks.

3. A computer program product comprising a non-transitory computer readable medium containing computer readable instructions for controlling operation of a computing apparatus to implement steps comprising:
   a. causing an input sub-system of the computing apparatus receiving data from an external computer system to encrypt the received data and then deposit the encrypted data in a store of the computing apparatus,
   b. using separate and independent checking means of the computing apparatus to each decrypt and then apply a content check to the data deposited in the store for the purpose of checking whether or not the data is safe for use with a sensitive computer system,
   c. if the data passes a content check, the respective checking means which implemented that content check then generating a digital signature for indicating that the data has passed the content check and storing a copy of the decrypted data and the generated signature associated therewith in the store, and
   d. using an output sub-system of the computing apparatus to retrieve the decrypted data from the store, to check the at least one digital signature associated therewith and to pass on the decrypted data to the sensitive computer system if it has passed the content checks.

* * * * *